United States Patent [19]

Ueda et al.

[11] 4,075,640
[45] Feb. 21, 1978

[54] CAMERA WITH EXPOSURE CONTROL MECHANISM

[75] Inventors: Hiroshi Ueda, Nara; Akira Yoshizaki, Osaka, both of Japan

[73] Assignee: Minolta Camera Kabushiki Kaisha, Osaka, Japan

[21] Appl. No.: 725,470

[22] Filed: Sept. 22, 1976

[30] Foreign Application Priority Data

Sept. 29, 1975   Japan ............................... 50-115486

[51] Int. Cl.² ............................................. G03B 7/08
[52] U.S. Cl. ........................................ 354/31; 354/59
[58] Field of Search ................ 354/31, 42, 49, 53, 354/54, 55, 56, 57, 59, 50, 51

[56] References Cited

U.S. PATENT DOCUMENTS

| | | | |
|---|---|---|---|
| 3,842,424 | 10/1974 | Tsunekawa et al. | 354/31 |
| 3,855,601 | 12/1974 | Uchiyama et al. | 354/31 |
| 3,864,699 | 2/1975 | Tsunekawa et al. | 354/31 |

*Primary Examiner*—L. T. Hix
*Assistant Examiner*—M. L. Gellner
*Attorney, Agent, or Firm*—Watson, Cole, Grindle & Watson

[57] ABSTRACT

An exposure control mechanism for a camera which includes a light measuring circuit having a photosensitive element disposed for receiving scene light reflected at substantially the entire area of both the surface of a film and a leading curtain of a focal plane shutter after the light has passed through an objective and a diaphragm. An operable member is provided for moving a light restricting member from a non-operative to an operative position where the member respectively permits the scene light reflected at the entire area or the scene light reflected at a small predetermined area of the surface to be received by the photosensitive element. An alternative light measuring circuit has a plurality of photosensitive elements respectively disposed for receiving the scene light reflected at different small predetermined areas of the surface. In this case, switches are provided for selectively activating the photosensitive elements of the light measuring circuit.

29 Claims, 20 Drawing Figures

CAMERA WITH EXPOSURE CONTROL MECHANISM

BACKGROUND OF THE INVENTION

The present invention relates to an exposure control mechanism for a camera.

More specifically the type of exposure control mechanism of concern is utilized in a single lens reflex camera for controlling an exposure in accordance with the brightness of an object to be photographed. The type of exposure control mechanism of concern includes at least one photosensitive element disposed in a camera body for receiving the scene light reflected at the surface of a leading member of a focal plane shutter and/or the surface of a film loaded in the camera body after the light has passed through an objective lens and a diaphragm. The light impinging on the photosensitive element causes the generation of this element of an output commensurate with the brightness of an object. The above term "and/or" designates the following three cases:

(a) before the travel of the leading member, the photosensitive element receives scene light reflected from the surface of the leading member;

(b) during the travel of the leading member, the photosensitive element receives both scene light reflected from the surface of the leading member and scene light reflected from the exposed surface of the film; and, (c) after completion of the travel of the leading member, the photosensitive element receives scene light reflected from the surface of the film.

An exposure control system of this type is shown by U.S. Pat. No. 3,687,026 issued to T. Kobayashi et al.

Exposure control mechanisms of the above-described type have a general advantage that no memory member such as a condensor is required. The memory member is eliminated since there is no need to memorize an output of the photosensitive element after a reflecting mirror of a single lens reflex camera has been moved from its viewing position to its picture taking position. Conventional exposure control mechanisms of the above-described type, however, are constructed for providing either an average light measurement, in which the photosensitive element only receives the light reflected from the entire area of the surface of the leading member and/or the film, or a spot, i.e., partial, light measurement in which the photosensitive element only receives the light reflected from a predetermined portion of the surface of the leading member and/or the film. Several disadvantages are inherent with these systems.

In the conventional exposure control mechanisms of the average light measuring type, the output from the photosensitive element will not be commensurate with the brightness of a main object if the brightness of other surrounding objects changes rapidly during an exposure. This results in an improper exposure on the film of the image of the main object. Such a failure cannot be prevented however even when a possible occurrence of such a rapid change in the brightness can be anticipated for before the exposure operation. In order to prevent such a failure, however, the conventional exposure control devices of this type will require a memory member for memorizing the brightness of the object before occurrence of such a rapid change in the brightness. The requirement of such a memory element, however, means that the previously described general advantage is lost.

On the other hand, in the conventional exposure control mechanisms of the spot measuring type, the output from the photosensitive element will not be commensurate with the brightness of the main object when the image of the main object is formed on an area of the surface of the leading member and/or the film, which is different from the predetermined small area of the spot, because of flaming. In other words, an improper exposure for the main object will be obtained except when the camera is directed so that the image of the main object is formed on the predetermined small area of the surface of the leading member and/or the film. Here again, in order to avoid this drawback, a memory member is also required.

SUMMARY OF THE INVENTION

An object of the present invention is to provide an exposure control mechanism capable of avoiding the above-described drawbacks without utilizing any memory member.

Another object of the present invention is to provide an exposure control mechanism in which an exposure is selectively controlled due to an average light measurement and a partial light (or spot) measurement, that is, in accordance with the intensity of the scene light reflected from the entire area of the leading member and/or the film and the intensity of the scene light reflected from a predetermined small portion of the area.

Still another object of the present invention is to provide an exposure control mechanism in which an exposure is selectively controlled due to light measurements made from several spots, i.e., small portions, that is, in accordance with the intensity of the scene light reflected from a plurality of predetermined small areas of the surface of the leading member and/or the film.

In accomplishing these objects, an exposure control mechanism according to the present invention is provided with a light measuring circuit and a control circuit for controlling an exposure in accordance with an output of the light measuring circuit. The light measuring circuit includes at least one photosensitive element disposed for receiving scene light reflected from substantially the entire area of both the surface of a leading member of a focal plane shutter and/or the surface of a film, or for receiving scene light reflected from at least one predetermined small area of the surface of the leading member and/or the surface of the film which areas are different from each other.

Where the light measuring circuit includes only a single photosensitive element, then there is also provided a movable light restricting member and a switch, or operable, member for moving the light restricting member between an operative position and a non-operative position. When in its operative position, the light restricting member only allows scene light reflected at a predetermined small area on the surface of the leading member and/or the film to be received by the photosensitive element. When the light restricting member is in its non-operative position, the scene light reflected from substantially the entire area is received by the photosensitive element. By further control of the operable member, the light restricting member may be moved to another operative position for permitting scene light reflected from another predetermined small area of the leading member and/or the film to be received.

The operable member for controlling the movement of the light restricting member can be formed by a first operable member for moving the light restricting member in a first direction and a second operable member for moving the light restricting member in a second direction. In this case, the area of the surface of the leading member and/or the film, from which the light received by the photosensitive element is reflected, is varied in a two dimensional direction in accordance with the operation of the first and second operable members. The light restricting member is moved to its non-operative position when either of the first and second operable members is moved to a specific non-operative setting position.

In an alternative embodiment where the light measuring circuit includes a plurality of photosensitive elements, the operable member serves to selectively connect the photosensitive elements to a power source so as to be activated. The light measuring circuit generates an output commensurate with the average value of the outputs of the activated photosensitive elements. The operable member may be formed by a plurality of switches, each respectively connected to one of the photosensitive elements, with the photosensitive elements all being connected in parallel with each other through the switches.

With the exposure control mechanism of the present invention, the previously described disadvantages inherent in conventional mechanisms are eliminated. Hence, when a rapid change in the brightness of a part of the object with the exception of a principal portion, is anticipated before photographing, a photographer will control the operable member so that the light restricting member is moved to its operative position so that at least one of the photosensitive elements within the light measuring circuit is activated. A predetermined portion from which the light measurement is to be taken is selected so as to correspond with the image of the main portion of the object being photographed. On the other hand, when a picture is to be taken utilizing an average exposure value for the light measurement from the entire objective image, the photographer will control the operable member so that the light restricting member is moved to its non-operative position thereby activating all of the photosensitive elements within the light measuring circuit. The photographer can also control the operable member so that the light restricting member is moved to another operative position in order that light from another portion of the image of the main object which is reflected by a different corresponding predetermined area of the surface of the leading curtain and/or the film is received by the photosensitive element. Alternatively, the photographer can control the operable member so that one or more of the photosensitive elements are activated for receiving scene light reflected from different areas of the surface of the leading member and/or the film on which the image of the main object is formed.

DESCRIPTION OF THE PREFERRED EMBODIMENTS

Figure 1:
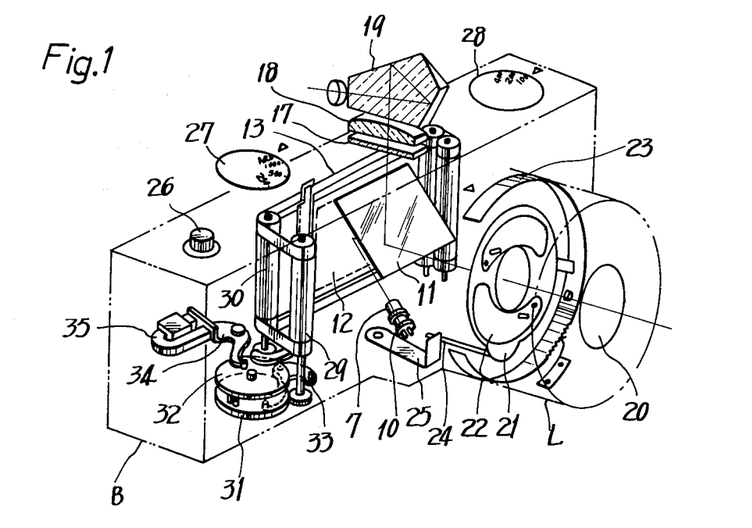
FIG. 1 is a perspective sectional view of a single lens reflex camera provided with an exposure control mechanism according to a first embodiment of the present invention.
Figure 2:
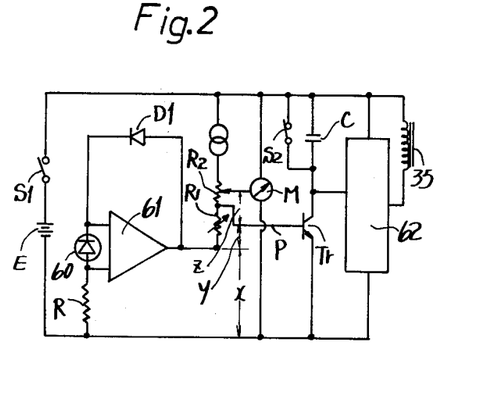
FIG. 2 is a schematic diagram of an exposure control circuit for the exposure control mechanism according to the first embodiment of the present invention.

A first embodiment of the present invention is illustrated in FIGS. 1 to 4. Referring first to FIGS. 1 and 2, there is shown a TTL type light measuring camera. The camera includes a light receiving element which receives light coming through an objective lens from an object, and reflected on the surface of a film and/or a leading curtain of a focal-plane-shutter which is opened upon exposure, so that an exposure is effected.

Referring to FIG. 1, a lens barrel shown by a broken line includes an objective lens 20, a diaphragm mechanism including diaphragm blades 22, a diaphragm-operating ring 21 and a diaphragm presetting ring 23. The diaphragm mechanism is biased so as to be normally open. A diaphragm cooperating pin 24 extends from diaphragm operating ring 21 into the body of the camera. The diaphragm mechanism is stopped down by means of a lever 25 which, in association with the releasing operation, stops down the diaphragm blades to a preset diaphragm-aperture against the normal bias of the diaphragm mechanism. The diaphragm is stopped-down upon depression of a release button 26 mounted on the body of the camera.

A movable mirror 11 mounted in the body of the camera is movable between a viewing position shown in FIG. 1 and a picture taking position which is upwardly biased through an angle of about 45° from the viewing position. Movable mirror 11 in its viewing position reflects the light passing through objective lens 20 and diaphragm 22 from an object onto a focussing plate 17 and through condensor lens 18 and pentaprism 19. The reflected light is then transmitted into a view-finder. Movable mirror 11 in its picture taking position allows the light to pass through leading curtain 12 of the focal-plane-shutter and then to a film 14 (shown in FIG. 4) in the rear of curtain 12, when curtain 12 starts travelling.

On the exterior of the camera body, there is provided a film sensitivity setting dial 28, a shutter speed dial 27, and a release button 26.

The operation of the focal-plane-shutter is described below. Leading curtain 12 and trailing curtain 13 are wound around winding shafts 29 and 30, respectively, by means of clockwise rotation of trailing curtain winding gear 32 and leading curtain winding gear 31, which cooperates with the operation of a film winding lever (not shown). Leading curtain 12 and trailing curtain 13 are locked in their respective wound positions by means of leading curtain locking lever 33 and trailing curtain locking lever 34, respectively. Upon depression of release button 26, movable mirror 11 is rotated to its picture taking position and leading curtain 12 is released from the locking action of forward curtain locking lever 33. Upon being released, leading curtain 12 starts travelling across the focal plane. After a lapse of time, an electromagnet 35 is deenergized from an excited condition, with the resulting release of the rear curtain from the locking action of rear curtain locking lever 34. Trailing curtain 13 then starts travelling, thus completing the exposure.

A light receiving member 10 is located in a position not to hinder the light passing through objective lens 20 and diaphragm 22 with lens barrel L coupled to camera body B from reaching exposed surfaces of film 14 and/or leading curtain 12, when movable mirror 11 is in its picture taking position. A light receiving element 60 in the light receiving member 10 is positioned for receiving the light reflected from the exposed surfaces of the shutter curtain and/or film, when movable mirror 11 is in its picture taking position. A light-receiving-angle-varying mechanism 7 is utilized in conjunction with light receiving member 10. Light receiving element 60 is connected in the circuit shown in FIG. 2. An output of the light receiving element actuates an exposure control circuit thereby interrupting an excited condition of electromagnet 35, thus completing the exposure. This control circuit is energized by potential source E which is switched on by switch S1.

When movable mirror 11 has been rotated to its picture taking position, light receiving element 60 receives: first the light reflected from the surface of leading curtain 12; next during the travel of leading curtain 12, the light reflected from the surface of leading curtain 12 and the surface of the film; and finally, after completion of the travel of leading curtain 12, the light reflected from the surface of the film. The reflectance of the surface of leading curtain 12 is made substantially equal to that of the surface of the film, so that the output of light receiving element 60 remains constant during the period of the above operation so long as the brightness of an object does not change. The output of light receiving element 60 actuates an exposure control circuit, as shown in FIG. 2, thereby interrupting the excited condition of electromagnet 35 and completing the exposure.

Light receiving element 60 is a photoelectric element. Photoelectric element 60 is connected in the negative-fed back path of an operational amplifier 61, through a diode D1. One end of photoelectric element 60 is connected to diode D1, while the other end of the photoelectric element 60 is connected to an output resistor R. In this manner, both ends of photoelectric element 60 are maintained at a zero voltage level, so that a voltage X proportional to a logarithmic value of the brightness of the received light is produced at an output of operational amplifier 61. The potential at a point $p$ is $X + Y$, which are the sum of a voltage X and a voltage Y produced at a film sensitivity variable resistor R1 which is set by means of the film sensitivity setting dial 28. The potential $X + Y$ is impressed on the base of a transistor Tr as an input, while a current of an amount corresponding to the brightness of an object and the set film sensitivity flows across the collector amd emitter of transistor Tr. A time-constant condensor C connected to the collector of transistor Tr starts changing due to the opening of a trigger switch S2, which is positioned in parallel with the condensor C. Switch S2 is opened in association with initiation of the movement of shutter leading curtain 12. When the charging voltage at condensor C reaches a given level, then a switching circuit 62 is operated to interrupt an excited condition of electromagnet 35, thereby releasing the rear curtain from its locked condition, thus completing the exposure. In this manner, the shutter speed is automatically controlled.

This shutter speed is indicated on ammeter M which receives voltages: X indicative of the brightness of an object; Y indicative of the film sensitivty setting; and Z indicative of a preset diaphragm setting. Voltage Z is obtained across resistor R2 which is varied in response to movement of preset diaphragm ring 23. Thus the shutter speed is indicated by ammeter M.

Figure 3:
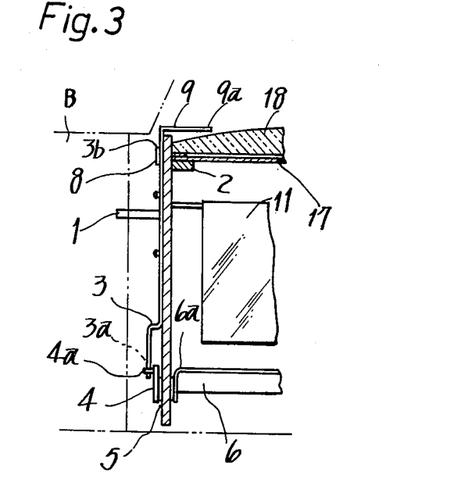
FIG. 3 is a front sectional view of a mechanism near the mirror box of the camera shown in FIG. 1.
Figure 4:
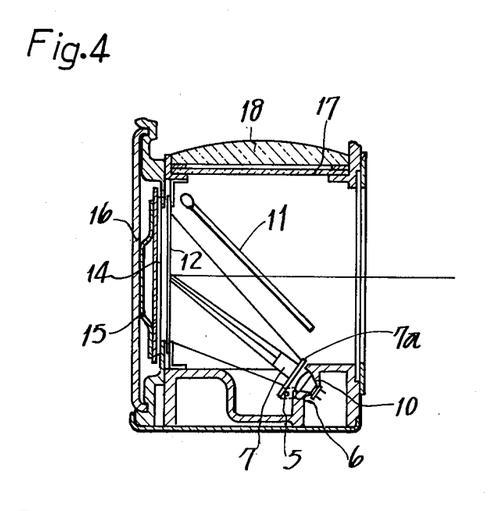
FIG. 4 is a side sectional view of the same mechanism shown in FIG. 3, viewed from the left side of the camera.

In this first embodiment, there is a light-receiving-angle-varying mechanism 7 positioned in the front of light receiving member 10, thereby allowing light from only a portion of the leading curtain and/or the film to reach member 10. As shown in FIG. 3, a slide member 3 is mounted on a mirror box 2 so as to be slidable with the aid of a pin and a slit in response to up and down movements of an external operating member 1. A connecting member 4 has a pin 4a fitted in a bifurcated portion 3a of slide member. Connecting member 4 is pivotally coupled to the lower side-surface of the mirror box by means of a pivot 5. An arm 6a of a rotatable member 6 is intergrally secured to pivot 5. In addition, light-receiving-angle-varying mechanism 7 is secured to rotatable member 6. A shielding plate 7a of light-receiving-angle-varying mechanism 7 shields unwanted light from being received by light receiving member 10, as shown in FIG. 4. An indicating member 9 has its top end in engagement with slide member 3. Indicating member 9 is rotatably mounted on the upper side-surface of the mirror box 2 by means of a shaft 8. As shown in FIG. 3, an indicating portion 9a of indicating member 9 appears within the view finder, indicating that a partial light measurement is effected when mechanism 7 causes partial light measurement by light receiving member 10. On the other hand, when mechanism 7 is completely retracted from the path of light receiving member 10, an average light measurement from the entire image surface is effected. In this case, indicating portion 9a is retracted from the view finder, thereby indicating that the average light measurement is being effected.

Indicating member 9 may be provided in the form of a lamp which is adapted to be lighted by means of a switch that is opened or closed due to a sliding movement of the sliding member 3. Member 9 is activated commensurate with switching between an average light measurement and a partial light measurement.

The first embodiment of the present invention enables only the switching between the average light measurement and the partial light measurement. The second embodiment shown in FIGS. 5 to 8 permits switching between an average light measurement and a partial light measurement as well as making it possible to select the part of the image surface from which the partial light measurement is to be taken.

Figure 5:
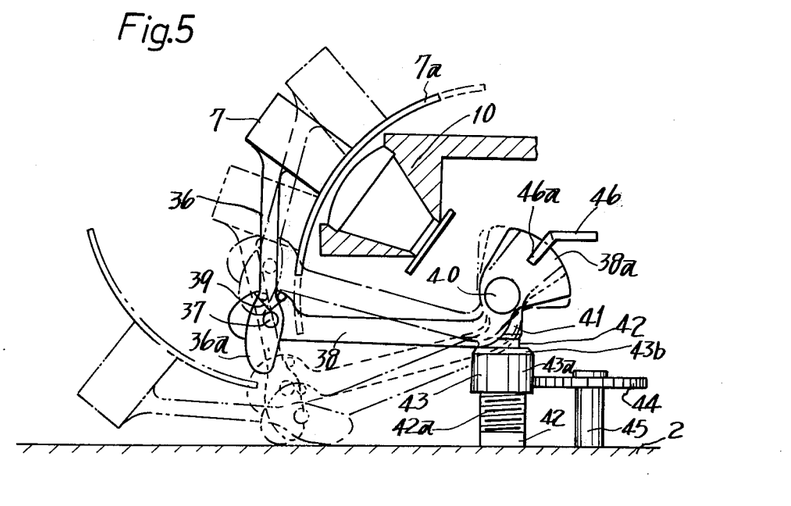
FIG. 5 is a side elevational view of a mechanism for varying the light receiving angle and corresponding operating mechanism utilized in the exposure control mechanism according to a second embodiment of the present invention.

As shown in FIG. 5, light-receiving-angle-varying member 7 is rigidly supported by a supporting arm 36, which is pivotally connected to a position control member 38 by means of a shaft 37, with a spring 39 positioned therebetween. A tip portion of supporting arm 36 is formed with a cam portion 36a adapted to contact a bottom plate of the mirror box 2. Two pins 42 and 45 are anchored in the bottom plate of mirror box 2, while a vertical position control gear 44 is rotatably mounted on pin 45. On the other hand, a sheath portion 43 threadably engages a threaded portion 42a of the outer surface of pin 42 and also meshes with gear 44. A tubular portion 41 is rotatably fitted on pin 42 in such a manner that there is some play. Position control member 38 is rotatably mounted on a shaft 40 extending perpendicularly to the axis of tubular member 41 and engages a shoulder portion 43b of sheath portion 43. An end portion 38a of position control member 38 engages a bifurcated portion 46a of a lateral position control member 46 which may be rocked in a direction at a right angle to the surface of the drawing in FIG. 5.

Accordingly, clockwise and counterclockwise rotations of gear 44 cause sheath portion 43 to move up and down relative to pin 42. In turn, shoulder portion 43b rotates position control member 38 in the clockwise or counterclockwise direction, thereby rotating the light-receiving-angle-varying member 7 together with a light shielding plate 7a. The result is that the specific portion subjected to partial light measurement is moved up and down within an image area, i.e., on the surface of forward curtain 12 and/or the film. In addition, the rocking movement of member 7 causes a rocking motion of the specific portion to be subjected to partial light measurement within the image area.

When sheath portion 43 is lowered a distance greater than a given value, then cam portion 36a abuts a bottom plate of mirror box 2. Member 7 can then be rotated in the counterclockwise direction relative to position control member 38 against the force of spring 39, thus assuming the position shown by the chain line in FIG. 5 for effecting an average light measurement of the entire image area.

Figure 6:
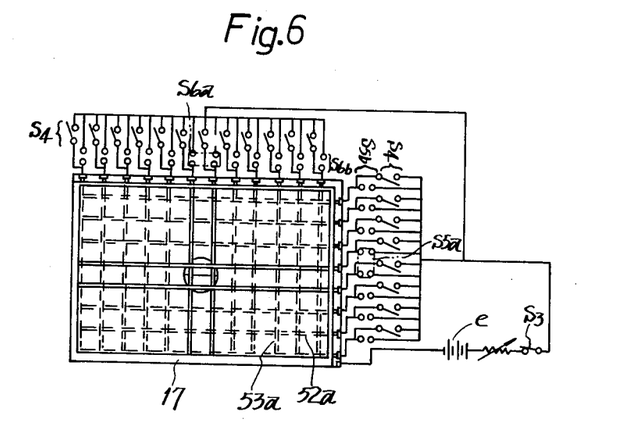
FIG. 6 is a plan view of a light measuring area indicating mechanism and a schematic diagram of the circuitry of this mechanism.
Figure 7:
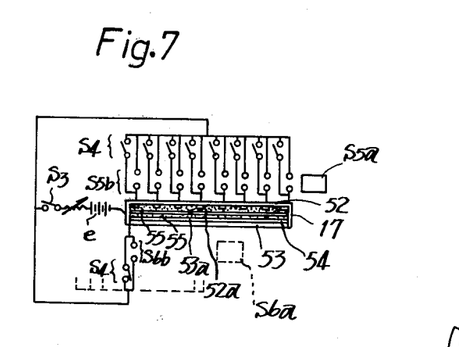
FIG. 7 is a cross-sectional view of the light indicating mechanism of FIG. 6.

A device for indicating a partial light-measuring position is illustrated in FIGS. 6 and 7. The device includes a focussing plate 17 arranged in a view finder and sectioned into squares, and a liquid crystal utilized for indicating the specific portion. The liquid crystal is interposed between transparent electrodes. When a voltage impressed across the electrodes is raised over a critical value, then the liquid crystal which has been transparent becomes turbid and whitened.

Provided on each of the opposing surfaces of transparent glass plates 52 and 53, which are in parallel with the focussing plate 17, are a plurality of transparent electrodes 52a and 53a. Electrodes 52a are parallel with each other. Likewise electrodes 53a are parallel with each other. Electrodes 52a, however, extend at a right angle to electrodes 53a. Positioned midway between glass plates 52 and 53 is an intermediate transparent electrode 54 having a polarity opposite to that of electrodes 52a and 53a. Liquid crystals 55 are each filled between the two of electrodes.

Electrode 54 is connected to one terminal of a potential source e, while the other terminal of the source e is connected by way of a switch S3, switches S4 and slide switches S5b, S6b to the respective electrodes 52a and 53a. Switches S4 and slide switches S5b, S6b are in parallel with electrodes 52a and 53a, respectively. Slide contacts S5a and S6a are provided for closing switches s5b and S6b, respectively.

Figure 8:
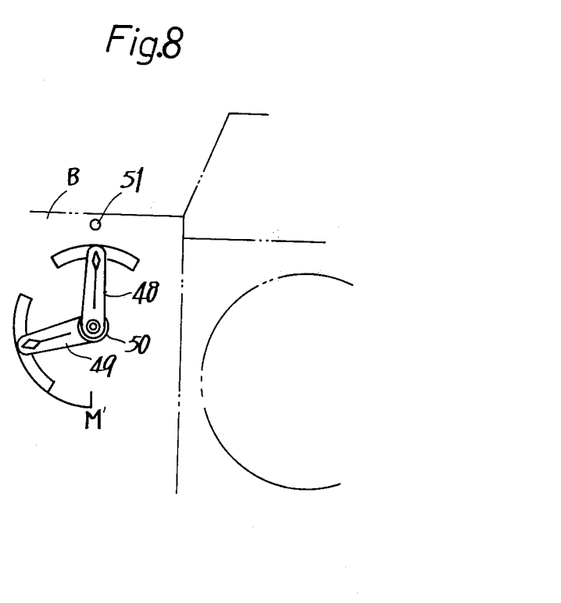
FIG. 8 is a side elevational view of the operating mechanism for the light receiving angle varying mechanism shown in FIG. 5.

An operating member positioned on the outer side-surface of camera body B is illustrated in FIG. 8. The operating member includes a lateral direction operating member 48 and a vertical direction operating member 49, both of which are pivotally mounted on a shaft 50 in a rotatable manner. Rotation of lateral direction operating member 48 causes lateral position control member 46 shown in FIG. 5 to rock. The resulting rocking motion of position control member 38 causes the light-receiving-angle-varying member to rock to the right and left, so that the specific portion to be subjected to partial light measurement is shifted to the right and left within the image area throughout its entire range. Likewise, sliding contact S6a is shifted to the right and left, thereby closing sliding switches S6b provided for electrodes 53a having the specific portion therebetween. A voltage is thereby impressed across corresponding electrodes 53a and intermediate electrode 54, thereby causing a liquid crystal to become turbid and whitened along such electrode 53a.

Likewise, the rotation of vertical direction operating member 49 causes gear 44 to rotate so as to move sheath portion 43 up and down along pin 42. Meanwhile shoulder portion of 43b of sheath portion 43 moves position control member 38 up and down so as to rock light-receiving-angle-varying member 7 in the vertical plane. This causes the specific portion, subjected to the partial light measurement, to be shifted up and down within the image area. Simultaneously, sliding contact S5a, as well, slides up and down, thereby closing sliding switch S5b of the upper and lower electrodes 52a which define the specific point to be measured. A voltage is then impressed across the corresponding electrodes 52a and the intermediate electrode 54, thus causing the liquid crystal between both electrodes to become turbid and whitened along the surface of such electrodes 52a.

FIG. 6 shows a case where the specific portion to be subjected to partial light measurement is positioned in the center of the image area.

When vertical direction operating member 49 is aligned with an index M' positioned at the extremity of a rotational range of member 49, then the light-receiving-angle-varying member assumes a position shown by the chain line in FIG. 5 so that an average light measurement can be effected.

In addition, pivot 50 may be depressed for the closing operation of the potential source switch S3. Vertical direction operating member 49 may be locked in position M' for allowing the average light measurement. The locked condition of vertical direction operating member 49 can then be released due to the depression of pivot 50, thereby allowing the rotation of member 49.

As an alternative, a push button switch 51, as shown in FIG. 8 may be provided. Depression of push button switch 51 causes potential source switch S3 and switches S4 to be closed, so that a voltage is impressed across all of the vertically arranged electrodes 52a, 53a and the intermediate electrode 54, with the result that a view finder may become turbid and whitened in the form of squares.

As a result, framing becomes possible for an image on the focusing plate. However, this has no bearing upon the indication of the light-measuring range of an image.

Figure 9:
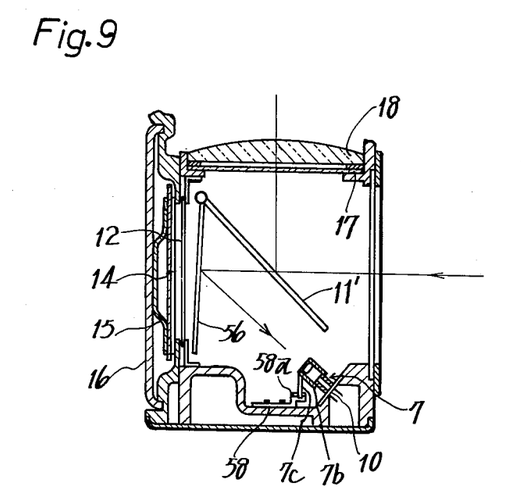
FIG. 9 is a cross-sectional view of a portion of an exposure control mechanism according to a third embodiment of the present invention.
Figure 10:
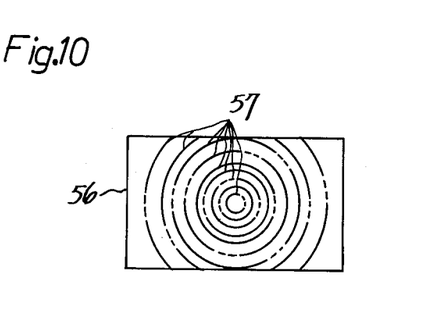
FIG. 10 is a schematic diagram showing the areas of an image surface to be measured by a light receiving element with the third embodiment of the present invention.

According to a third embodiment as shown in FIGS. 9 and 10, light-receiving-angle-varying member 7 is provided in the form of a barrel 7b which is movable along an optical axis of light receiving member 10, which is shown by an arrow. Thus, a pin 7c protruding from lens barrel 7b engages a bifurcated portion 58a of a sliding plate 58 which is slidable on the bottom plate of mirror box 2. Plate 58 is then slidingly moved in a forward and rearward direction by an external operating member not shown, thereby moving lens barrel 7b along the optical axis shown by the direction of the arrow.

With the above-described arrangement, an image on the surface of leading curtain 12 and/or the film may be received in a concentric fashion 57 as shown in FIG. 10, with the size of the partial light measurement in its central portion being capable of being continuously increased to the average light measurement for an entire image surface.

In further accord with this third embodiment, a movable mirror is provided in the form of two half-mirrors having different reflection factors. Thus, when first mirror 11' is in a viewing position, this first mirror reflects 70% of the incident light in a finder, while the remaining 30% of the incident light is directed towards a focal-plane-shutter-leading curtain. A second mirror 56 is arranged in a position facing the entire surface of a focal plane shutter and adapted to reflect the incident light 100%. Upon exposure both mirrors 11' and 56 are retracted from a viewing position to a photographing position so that incident light may be 100% directed to the surface of a film. First half mirror 11' is rotated through an angle of about 45%, and second total reflecting mirror 56 is rotated through an angle of about 90°. In other words, during a swinging operation of second mirror 56, the second mirror will overlap first mirror 11' during their rotations.

When mirrors 11' and 56 are in their viewing position, light of an amount of 30% of the light from an object may be incident on light receiving member 10. In general, the reflectance of the surface of a film corresponds to about 30% of incident light. As a result, the reflecting light will be equal in amount to the light incident on light receiving member 10 during exposure control due to partial light measurement for an object.

Accordingly, before the operation of release button 26 the image of the object to be photographed is positioned in the center of an image surface for the partial light measurement, and then brightness is indicated on meter M of FIG. 2, thereby indicating an optimum shutter speed. Thus, in the case where a main object is selectively positioned in a desired position within a finder and a shutter speed dial 27 is set to the optimum shutter speed from an "auto" position so as to effect exposure at such shutter speed, then at optimum exposure for the main object may be effected, whatever position the main object assumes within the image surface.

With this embodiment, if the light transmission factor of first half mirror 11' is 40%, then the reflectance of second mirror 56 may be set to about 70%. In short, it suffices that the transmittance and the reflectance of the both reflecting mirrors are so set that about 30% of light may be incident when mirrors 11' and 56 are in their viewing position.

FIGS. 11 to 19 show a fourth embodiment, in which a plurality of light receiving elements (SBC, i.e., silicon blue cells) are positioned for receiving reflected light from different areas of the surface of the shutter curtain and/or film. The light receiving elements are connected to an operational amplifier so that the light measuring area may be varied, as desired.

Figure 11:
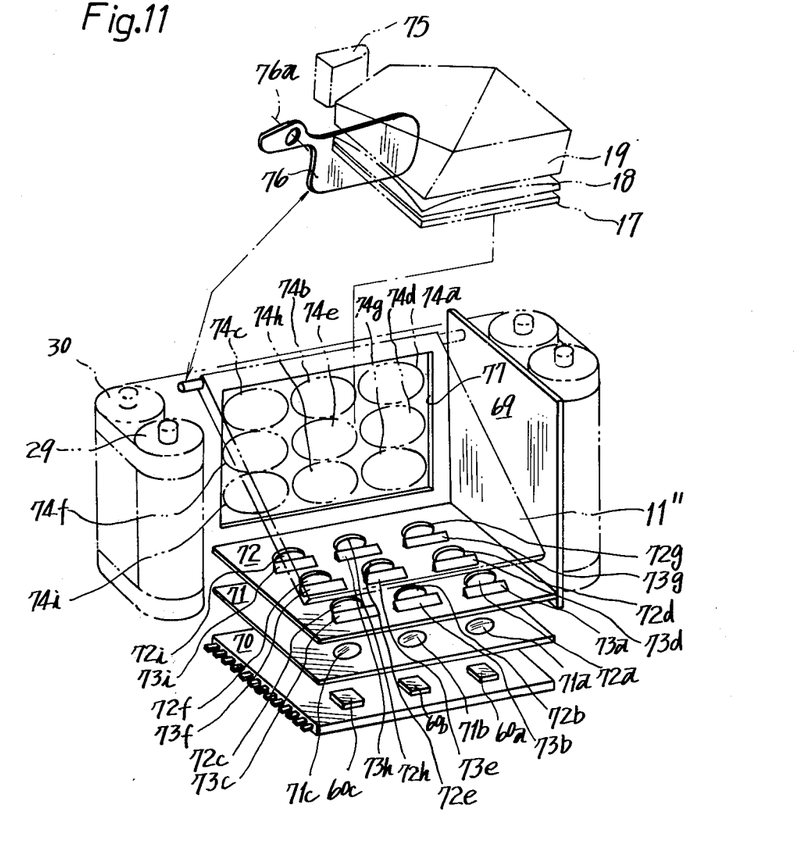
FIG. 11 is a sectional perspective view showing an arrangement of light receiving elements of an exposure control mechanism according to a fourth embodiment of the present invention.

Referring now to FIG. 11, there is shown a side wall 69 of the mirror box which houses mirror 11'. A printed plate 70, opaque plate 71 and light-shielding plate 72 are superposed one on top of another in a bottom position of the mirror box. Printed plate 70 has light receiving elements 60a, 60b . . . 60i on its top surface. Opaque plate 71 has plastic condensor lenses 71a, 71b . . . 71i. Light shielding plate 72 is provided with light-admitting openings or lighting openings 72a, 72b . . . 72i and light shielding pieces 73a, 73b . . . 73i. Condensor lenses 71a, 71b . . . 71i and lighting openings 72a, 72b . . . 72i provide means for limiting the light receiving range of each of the corresponding light receiving elements 60a, 60b . . . 60i. Respective light receiving elements 60a, 60b . . . 60i thus receive reflecting light from respective predetermined areas 74a, 74b . . . 74i of the surface of the shutter curtain and/or film encompassed with a film frame 77 through corresponding lighting openings 72a, 72b . . . 72i, and condensor lenses 71a, 71b . . . 71i. Light shielding pieces 73a, 73b . . . 73i prevent unwanted light from being incident on light receiving elements 60a, 60b . . . 60i from the front of the camera.

With this embodiment, a half mirror formed of aluminum or a silver-coated opaque plastic plate is used as mirror 11". As a result, when mirror 11" is shifted upwards to a picture taking position, unwanted light passing through an eye piece 75 is incident on the light receiving elements 60a, 60b . . . 60i through pentagonal prism 19, condensor lens 18, focussing plate 17 and the mirror itself. For this reason an eyepiece shutter 76 is positioned between pentagonal prism 19 and eye-piece 75 to shield unwanted light. Shutter 76 rotates about a shaft 76a to this position in association with the shifting of mirror 11" to its picture taking position.

Figure 12:
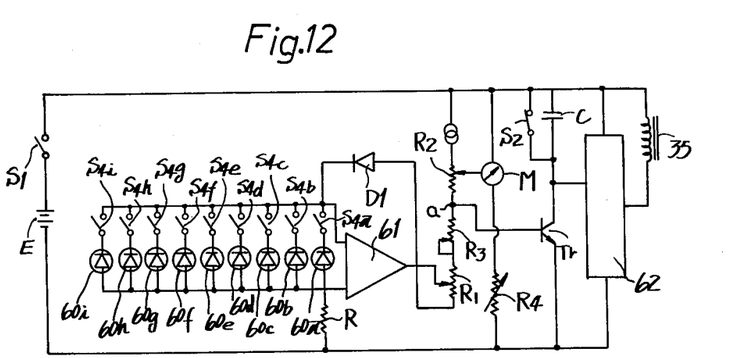
FIG. 12 is a schematic diagram of the exposure control circuit of the fourth embodiment of the present invention.

FIG. 12 shows an electric circuit for use with the arrangement shown in FIG. 11, with those components common with the circuit of FIG. 2 being designated by like reference numerals. With this circuit, light receiving elements 60a, 60b . . . 60i are connected in parallel with each other by way of switches S4a, S4b ... S4i to the input terminals of an operational amplifier 61. Switches S4a, S4b ... S4i may be opened or closed, as required, by means of a switching mechanism. When three switches S4a, S4b and S4c are thrown to their closed positions, then there appears a voltage at an output terminal of operational amplifier 61, which voltage is proportional to the logarithmic value of the total sum of the currents produced at light receiving elements 60a, 60b and 60c. Where the intensities of light incident on light receiving elements 60a, 60b and 60c are equal to each other, then the voltage appearing at the output terminal of the operation amplifier is raised by log 3 EV, as compared with the voltage appearing when only one of switches S4a, S4b, S4c is closed. (EV represents an exposure value according to the APEX designation.) As a result, for exposure control based on an average value of the intensities of light beams which are incident on light receiving elements 60a, 60b, 60c, it is required that the potential at point a, to which is connected the base of transistor Tr, be lowered by a factor corresponding to log 3 EV. A variable resistor R3 is used for this purpose. The resistance of variable resistor R3 is set in such a manner that the potential at point a is lowered by a factor corresponding to log nEV, when switches of n in number, of switches S4a, S4b ... S4i, are closed.

Meanwhile, since a half mirror is used as reflecting mirror 11'' in this embodiment, an indication of a shutter speed in meter M prior to starting of exposure is different from that of the meter during exposure. A resistor R4 compensates for this difference, thereby enabling an indication of the shutter speed which should be set in an actual application prior to exposure. The resistance of resistor R4 is preset to a given value, which is commensurate with the transmittance of movable mirror 11''.

Figure 13:
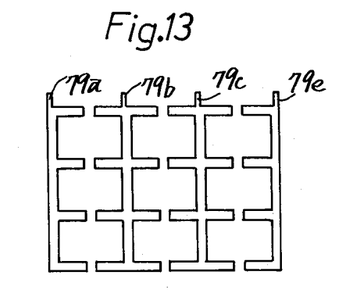
FIG. 13 is a plan view of the transparent electrodes included in a light measuring area indicating mechanism of the fourth embodiment.
Figure 14:
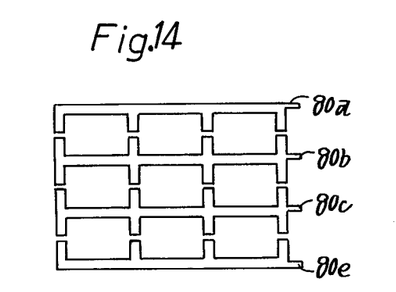
FIG. 14 is a plan view of the second transparent electrodes included in the light measuring area indicating mechanism of the fourth embodiment.
Figure 15:
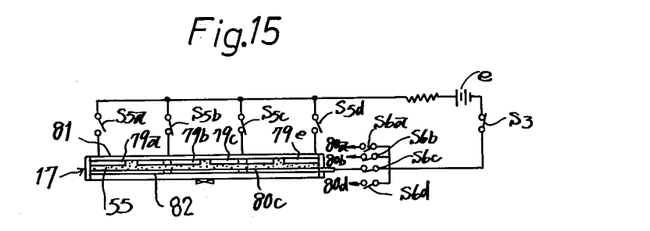
FIG. 15 is a cross-sectional view of the light measuring area indicating mechanism and a schematic diagram of the corresponding circuit of the fourth embodiment.

FIGS. 13 to 15 show a mechanism for indicating the area over which the light measurement is made. This indicating mechanism is built into focussing plate 17. The mechanism includes a transparent glass plate 81 having four transparent electrodes 79a, 79b, 79c, 79d, which are continuous in the vertical direction, as shown in FIG. 13 and a transparent glass plate 82 having four transparent electrodes 80a, 80b, 80c, 80d, which are continuous in the lateral direction, as shown in FIG. 14. A liquid crystal 55 is filled between glass plates 81 and 82. As best shown in FIG. 15, transparent electrodes 79a, 79b, 79c, 79d on transparent glass plate 81 are connected by way of switches S5a, S5b, S5c, S5d to the anode of cell e. Transparent electrodes 80a, 80b, 80c, 80d on transparent glass plate 82 are connected by way of switches S6a, S6b, S6c, S6d to the cathode of cell e.

Figure 16:
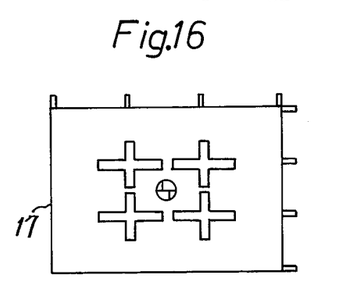
FIGS. 16 and 17 illustrate exemplary frames of a field of view formed by the light measuring indicating mechanism of the fourth embodiment.
Figure 17:
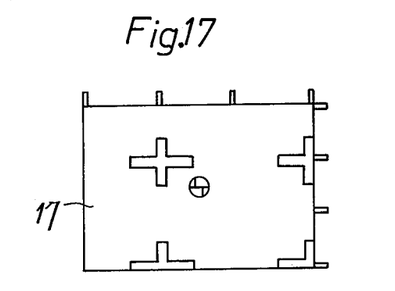

Switches S5a, S5b, S5c, S5d and switches S6a, S6b, S6c, S6d are designed so as to be opened or closed in association with the switching of switches S4a, S4b ... S4i. For instance, when the switch S4e is closed, switches S5b, S5c and switches S6b, S6c are closed, and on the other hand, when switches S4a, S4b, S4d, S4e are closed, then the switches S5b, S5d and switches S6b, S6d are closed. FIG. 16 shows the frame of the field of view formed by the liquid crystal, which becomes turbid and whitened, when switches S5b, S5c, and switches S6b, S6c are closed. FIG. 17 shows the frame of the field of view formed by the liquid crystal 55 when the switches S5b, S5d and switches S6b, S6d are closed.

Figure 18:
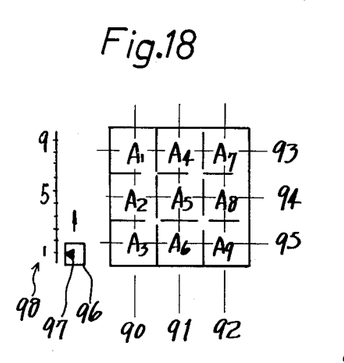
FIG. 18 is a plan view of operating buttons and an operating member for the exposure control mechanism and the light measuring area indicating mechanism of the fourth embodiment.
Figure 19:
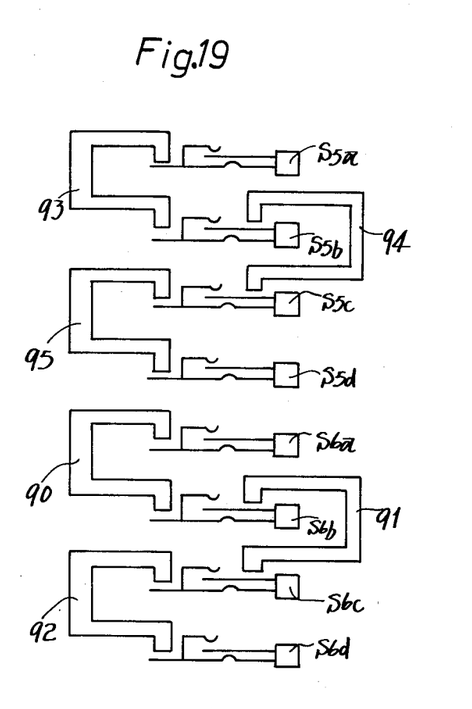
FIG. 19 is a schematic diagram of the switch operating mechanism for the light measuring area indicating mechanism for the fourth embodiment.

The switching mechanism for the previously described embodiment is illustrated in FIGS. 18 and 19. Push buttons A1 to A9 are provided on the body of the camera. Switches S4a, S4b ... S4i, although not shown, are positioned under buttons A1 to A9. Push button A1 is designed so as to cooperate with switch operating pieces 90, 93; push button A2 with switch operating pieces 90, 94; push button A3 with switch operating pieces 90, 95; push button A4 with switch operating pieces 91, 93; push button A5 with switch operating pieces 91, 94; push button A6 with switch operating pieces 91, 95; push button A7 with switch operating pieces 92, 93; push button A8 with switch operating pieces 92, 94; and push button A9 with switch operating pieces 92, 95. As shown in FIG. 19, switches S5a, S5b, S5c, S5d, S6a, S6b, S6c, S6d and switch operating pieces 90, 91, 92, 93, 94, 95 are positioned close to each other.

Consequently, when push button A5 is depressed so as to close switch S4e, then switch operating pieces 91, 94 are moved downwards, as viewed in the drawing, switches S5b, S5c, S6b, S6c are closed, and thus the frame of the field of view shown in FIG. 16 is formed. On the other hand, when push buttons A5, A6, A8, A9 are depressed so as to close switches S4a, S4b, S4d, S4e, then switch operating pieces 91, 92, 94, 95 are moved downwards as viewed in the drawing, switches S5b, S5d, and switches S6b, S6d are closed, and thus the frame of the field of view shown in FIG. 17 is formed.

In FIG. 18, there is shown an operating member 96 adapted to set the resistance of variable resistor R3. The resistance of variable resistor R3 may be set by sliding member 96 and bringing an index 97 in alignment with an index 98.

In accordance with this embodiment, the depression of push buttons A1, A2 ... A9 allows selection of the light measuring areas on the surface of a shutter curtain and/or film. The presetting of the resistance of resistor R3 enables an average light measurement to be obtained, which measurement is commensurate with the average brightness of all areas selected. This measurement is utilized for controlling the shutter speed and thus the exposure. In addition, when a plural number of push buttons are depressed, there is formed a frame of a field of view showing all areas selected, thus obviating a shortcoming experienced with the embodiment shown in FIGS. 6 and 7 in that there are formed respective frames for finely sectioned areas.

Figure 20:
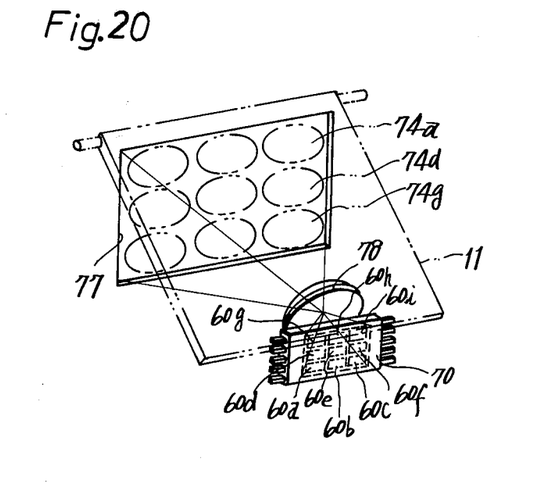
FIG. 20 is a perspective view of a portion of an exposure control mechanism according to a fifth embodiment of the present invention.

Meanwhile, with this embodiment, condensor lenses 71a, 71b ... 71i are provided in correspondence with light receiving elements 60a, 60b ... 60i. As an alternative, these condensor lenses may be replaced by a single condensor lens 78 as shown in FIG. 20, so that the respective areas 74a, 74b ... 74i may be projected in a reduced size through the condensor lens 78 on light receiving elements 60a, 60b ... 60i.

It is noted that the above description and the accompanying drawings are provided merely to present exemplary embodiments of the present invention and that additional modifications of such embodiments are possible within the scope of this invention without deviating from the spirit thereof.

We claim:

1. A camera comprising:
   an objective lens;
   a diaphragm;
   a camera body in which a film is located at the focal plane of said objective lens;
   light responsive means arranged within said camera body for receiving scene light passing through said objective lens and providing an output signal in response to such light;

means for indicating an exposure value in accordance with an output of said light responsive means;

first reflecting means disposed between said focal plane and said objective lens, said first reflecting means being half transparent and being movable between a first position for causing scene light having passed through said objective lens and said diaphragm to be partially reflected away from said focal plane and partially passed through towards said focal plane and a second position for permitting all of such scene light to pass towards said focal plane;

second reflecting means disposed behind said first reflecting means and in front of said focal plane, said second reflecting means being movable together with said first reflecting means between a first position for reflecting towards said light responsive means scene light having passed through said first reflecting means when in its first position and a second position when said first reflecting means is in its second position for permitting such scene light to pass towards said focal plane;

light restricting means disposed in front of said light responsive means for restricting scene light incident on said light responsive means, said light restricting means including a central aperture and being movable with said aperture being in alignment with said light responsive means and said second reflecting means when in its first position; and, manual switch means for moving said light restricting means relative to said light responsive means.

2. A camera as defined in claim 1, further comprising:
a focal plane shutter including a leading member and a trailing member which control the light reaching an image plane of the film to be exposed, the reflectance of the surface of said leading member being substantially equal to that of the surface of the film;

means for driving said leading member to initiate an exposure of the film;

means for driving said trailing member to terminate the exposure;

means for actuating said means for driving said trailing member subsequent to initiation of the movement of said leading member after a time interval dependent upon the output signal of said light responsive means generated when said first and second reflecting means are in their second positions; and, wherein said light responsive means is arranged within said camera so as to be capable of receiving scene light passing towards said focal plane when said first and second reflecting means are in their second positions and such light is reflected from the area of the surface of said leading member and the surface of said film.

3. A camera including an objective lens, a diaphragm, a camera body in which a film is located at the focal plane of said objective lens, a focal plane shutter having a leading member and a trailing member which control the light reaching an image plane of the film to be exposed, the reflectance of the surface of said leading member being substantially equal to that of the surface of the film, means for driving said leading member to initiate an exposure of the film, and an exposure control mechanism, said exposure control mechanism comprising:

light measuring means for generating an output commensurate with the brightness of an object to be photographed, said light measuring means including photosensitive means disposed in said camera body so as to be capable of receiving scene light having passed through said objective lens and said diaphragm and reflected from the area of the surface of said leading member and the surface of the image plane of the film as said leading member is driven so as to expose the film;

means for changing the light receiving angle of said photosensitive means, said light receiving angle changing means being movable between a first position in which said light receiving angle changing means is in alignment with the image plane of the film and said photosensitive means and a second position in which said light receiving angle changing means has been withdrawn from said first position, in such a manner that said photosensitive means receives scene light reflected from one of two areas on the surface of said leading member and the surface of said film in dependence upon whether said light receiving angle changing means is in its first position or in its second position, said two areas being different from one another in dimensions;

switch means for moving said light receiving angle changing means between its first and second positions; and, means for controlling an exposure in accordance with the output of said light measuring circuit.

4. A camera as defined in claim 3, wherein said controlling means includes: means for driving said trailing member for terminating the exposure; and means for actuating said means for driving said trailing member after initiation of the movement of said leading member in dependence upon the output of said light measuring means.

5. A camera as defined in claim 3, wherein said light receiving angle changing means includes a light blocking member having a central aperture and said switch means includes means for selectively positioning said light blocking member in front of said photosensitive means at such a position that said aperture is aligned with said photosensitive means and the image plane of the film and withdrawing said light blocking member from its position in front of said photosensitive means.

6. A camera as defined in claim 3, further comprising means for indicating whether said light restricting means is in its first position or in its second position.

7. A camera as defined in claim 6, wherein said indicating means is coupled to said switch means so as to make the indication in accordance with the position of said switch means.

8. A camera as defined in claim 7, further comprising a view finder optical system, and wherein said indicating means includes an indicating member disposed in said view finder optical system so as to be observed in its viewing filed.

9. A camera including an objective lens, a diaphragm, a camera body in which a film is loaded at the focal plane of the objective lens, a focal plane shutter having a leading member and a trailing member which control the light reaching an image plane of the film to be exposed, the reflectance of the leading member being substantially equal to that of the surface of the film, means for driving the leading member to initiate an exposure of the film, and an exposure control mechanism, the exposure control mechanism comprising:

light measuring means for generating an output commensurate with the brightness of an object to be photographed, said light measuring means including photosensitive means disposed in the camera body for receiving scene light passing through said objective lens and said diaphragm and reflected from substantially the entire area of both the surface of said leading member and the image plane of the film as said leading member is driven so as to expose the film;

means for controlling an exposure in accordance with the output of said light measuring means;

light restricting means for restricting scene light from being received by said photosensitive means, said light restricting means being movably supported on said camera body and positioned in front of said photosensitive means;

first operable means for moving said light restricting means in front of said photosensitive means in a first direction transversing the scene light advancing to said photosensitive means; and, second operable means for moving said light restricting means in front of said photosensitive means in a second direction substantially perpendicular to said first direction and transversing the scene light advancing to said photosensitive means;

whereby the area of the surface of said leading member and the image plane of the film, from which light received by said photosensitive means is reflected, is varied in a two dimensional direction in accordance with the operation of said first and second operable means.

10. A camera as defined in claim 9, wherein said controlling means includes:

means for driving said trailing member for terminating the exposure; and means for actuating said means for driving said trailing member after initiation of the movement of said leading member in dependence upon the output of said light measuring means.

11. A camera as defined in claim 9, wherein said light restricting means is removable from its position in front of said photosensitive means for enabling scene light reflected from said entire area to be received by said photosensitive means when said first operable means is set to a specific position.

12. A camera as defined in claim 11, wherein said light restricting means includes a light blocking member having an aperture, an arm supporting said light blocking member, a member swingable in a direction due to the operation of said first operable means and rotatably supporting said arm, a projection formed on said swingable member to engage with said arm, and a spring connected between said arm and said swingable member for biasing said arm into engagement with said projection, said swingable member being swung together with said arm to a position where said aperture of said light blocking member is aligned with said photosensitive means and said entire area when said first operable means is in its normal operative position, whereas when said first operable means is moved to said specific position, said swingable member is swung together with said arm to a position where said arm contacts said camera body so as to be rotated against the force of said spring so that said light blocking member is removed from in front of said photosensitive means.

13. A camera as defined in claim 9, further comprising: means for indicating the area of an object being photographed corresponding to the portion of said entire area from which scene light received by said photosensitive means is reflected.

14. A camera as defined in claim 13, further comprising: a reflecting mirror movable between a viewing position and a picture taking position for respectively reflecting and passing scene light travelling toward said leading member after having passed through said objective lens and said diaphragm;

a focussing plate disposed above said reflecting mirror so that an image of the object is formed thereon when said movable mirror is in its viewing position;

a pentagonal prism disposed above said focussing plate for transmitting the image of the object; and an eye-piece disposed behind said pentagonal prism for receiving the image transmitted through said pentagonal prism;

and wherein said indicating means is disposed adjacent to said focussing plate.

15. A camera as defined in claim 14, wherein said indicating means includes;

a first transparent plate having first transparent electrodes longitutionally arranged thereon;

a second transparent plate having second transparent electrodes laterally arranged thereon;

a third transparent electrode disposed between said first and second transparent plates and covering the entire surfaces of said first and second transparent plates;

a liquid crystal filled between said first transparent plate and said third transparent electrode and between said second transparent plate and said third transparent electrode;

a power source connected between said first transparent electrodes and said third transparent electrode and between said second transparent electrodes and said third transparent electrode;

a set of first switches connected between said first transparent electrodes and said power source, said first switches being in parallel with each other;

a set of second switches connected between said second transparent electrodes and said power source, said second switches being in parallel with each other; and, means coupled with said first and second operable means for selectively closing said first and second switches in accordance with the operation of said first and second operable means so that voltage is applied between said third transparent electrode and corresponding said first transparent electrodes and between said third transparent electrode and corresponding said second transparent electrodes, said corresponding first and second transparent electrodes surrounding the area of the image of the object formed on said focussing plate corresponding to the portion of said entire area from which scene light received by said photosensitive means is reflected.

16. A camera including an objective lens, a diaphragm, a camera body in which a film is located at the focal plane of the objective lens, a focal plane shutter having a leading member and a trailing member which control the light reaching an image plane of the film to be exposed, the reflectance of the leading member being substantially equal to that of the surface of the film, means for driving the leading member to initiate an exposure of the film, and an exposure control mechanism, said exposure control mechanism comprising:

light measuring means including a plurality of photosensitive means disposed in said camera body to respectively receive scene light passing through said objective lens and said diaphragm and reflected from different portions of the entire area of the surface of said leading member and exposed portions of said film;

operable means for selectively activating said photosensitive means of said light measuring means, said light measuring means generating an output commensurate with the average value of the outputs of said activated photosensitive means; and, means for controlling an exposure in dependence upon the output of said light measuring means.

17. A camera as defined in claim 16, wherein said controlling means includes:

means for driving said trailing member for terminating an exposure; and, means for actuating said means for driving said trailing member after initiation of the movement of said leading member in dependence upon the output of said light measuring means.

18. A camera as defined in claim 16, wherein said activating means includes a plurality of first switches, each respectively connected to one of said photosensitive means, and said photosensitive means are connected in parallel with each other through said first switches.

19. A camera as defined in claim 18, wherein said photosensitive means are photoelectric elements which respectively generate a current proportional to the intensity of scene light received thereby and wherein the light measuring means further includes:

a first conduit connected to said photoelectric elements though said first switches for generating a voltage proportional to logarithm of the sum of the currents generated by said photoelectric elements connected to respective said first switches in a closed condition; and a second circuit for lowering said voltage in dependence upon the number of said first switches in a closed condition.

20. A camera as defined in claim 19, wherein said second circuit includes resistor means providing an adjustable resistance for lowering said voltage.

21. A camera as defined in claim 16, further comprising means for indicating the portion of the area of the object to be photographed corresponding to the portion of the surface of the film, from which scene light received by said activated photosensitive means is reflected.

22. A camera as defined in claim 21, further comprising:

a reflecting mirror movable between a viewing position and a picture taking position for respectively reflecting and passing scene light travelling toward said leading member after having passed through said objective lens and said diaphragm;

a focussing plate disposed above said movable mirror so that an image of the object to be photographed is formed thereon when said movable mirror is in its viewing position;

a pentagonal prism disposed above said focussing plate for transmitting the image of the object; and an eye-piece disposed behind said pentagonal prism for receiving the image of the object transmitted through said pentagonal prism:

and wherein said indicating means is disposed adjacent to said focussing plate.

23. A camera as defined in claim 22, wherein said indicating means includes:

a first transparent plate having first transparent electrodes longitutionally arranged thereon;

a second transparent plate having second electrodes laterally arranged thereon;

a liquid crystal filled between said first and second transparent plates;

a power source connected between said first transparent electrodes and said second transparent electrodes;

a set of first switches, each connected between a respective one of said first transparent electrodes and said power source, said first switches being in parallel with each other;

a set of second switches, each connected between a respective one of said second transparent electrodes and said power source, said second switches being in parallel with each other; and means cooperating with said activating means for selectively closing said first and second switches, so that a voltage is applied between selected said first transparent electrodes and said second transparent electrodes surrounding the portion of the image of the object formed on said focussing plate, such portion corresponding to the portion of said entire area from which sense light received by said activated photosensitive means is reflected.

24. A camera as defined in claim 22, wherein said reflecting mirror is half-transparent so that part of the scene light passing through said objective lens and said diaphragm can pass through said mirror so as to be received by said photosensitive means after being reflected at the surface of said leading member when said movable mirror is in its viewing position.

25. A camera including an objective lens, a diaphragm, a camera body in which a film is loaded at the focal plane of the objective lens, a focal plane shutter having a leading member and a trailing member which control the light reaching an image plane of the film to be exposed, the reflectance of the surface of the leading member being substantially equal to that of the surface of the film, means for driving the leading member to initiate an exposure of the film, and an exposure control mechanism, said exposure control mechanism comprising:

light measuring means for generating an output commensurate with the brightness of an object to be photographed, said light measuring means including photosensitive means being disposed in said camera body so as to be capable of receiving scene light passing through said objective lens and said diaphragm and reflected from substantially the entire body of both the surface of said leading member and the image plane of the film as said leading member is driven so as to expose the film;

light restricting means movable from a first position for enabling the scene light reflected from said entire area to be received by said photosensitive means to a second position for permitting only the scene light reflected from a predetermined portion of said entire area to be received by said photosensitive means and said light restricting means also being movable to a third position for enabling only the scene light reflected from another predetermined portion of said entire area to be received by said photosensitive means;

switch means for moving said light restricting means between its first, second and third positions; and, means for controlling an exposure in accordance with the output of said light measuring means.

26. A camera including an objective lens, a diaphragm, a camera body in which a film is loaded at the focal plane of the objective lens, a focal plane shutter having a leading member and a trailing member which control the light reaching an image plane of the film to be exposed, the reflectance of the surface of the leading member being substantially equal to that of the surface of the film, means for driving the leading member to initiate an exposure of the film, and an exposure control mechanism, said exposure control mechanism comprising:

light measuring means for generating an output commensurate with the brightness of an object to be photographed, said light measuring means including photosensitive means being disposed in said camera body so as to be capable of receiving scene light passing through said objective lens and said diaphragm and reflected from substantially the entire area of both the surface of said leading member and the image plane of the film as said leading member is driven so as to expose the film;

light restricting means movable from a first position for enabling the scene light reflected from said entire area to be received by said photosensitive means to a second position for permitting only the scene light reflected from a predetermined portion of said entire area to be received by said photosensitive means and said light restricting means including a light blocking member having a central aperture and being positioned in front of said photosensitive means;

switch means for moving said light restricting means between its said first and second positions, said switch means including means for selectively moving said light blocking member to a position adjacent to said photosensitive means and to a position apart from said photosensitive means with said aperture being aligned with said photosensitive means and said image plane of said film, such that said light blocking member is moved between the position adjacent to said photosensitive means and the position apart from said photosensitive means respectively when said switch means moves said light restricting means between its first position and its second position; and, means for controlling an exposure in accordance with the output of said light measuring means.

27. A camera as defined in claim 26, wherein said controlling means including: means for driving said trailing member for terminating the exposure; and means for actuating said means for driving said trailing member after initiation of the movement of said leading member in dependence upon the output of said light measuring means.

28. A camera as defined in claim 26, further comprising means for indicating whether said light restricting means is in its first position or in its second position.

29. A camera as defined in claim 26, wherein said exposure control mechanism further comprises:

first reflecting means disposed between said leading member and said objective lens, said first reflecting means being half-transparent and being movable between a first position for partially reflecting and partially passing scene light passing through said objective lens and said diaphragm and a second position for passing all of such scene light;

second reflecting means disposed behind said first reflecting means and in front of said leading member, said second reflecting means being movable together with said first reflecting means between a first position for reflecting toward said photosensitive means scene light passing through said first reflecting means in its first position and a second position when said first reflecting means is in its second position for passing such scene light toward said leading member and the film, the product of the transmittance of said first reflecting means and the reflectance of said second reflecting means being substantially equal to the reflectance of the surface of the film; and, means for indicating an exposure value in accordance with the output of said photosensitive means generated before movement of said first and second reflecting means to their second positions.

* * * * *